(12) United States Patent
Hennig et al.

(10) Patent No.: US 11,657,096 B2
(45) Date of Patent: May 23, 2023

(54) FREE-FORM, AUTOMATICALLY-GENERATED CONVERSATIONAL GRAPHICAL USER INTERFACES

(71) Applicant: PayPal, Inc., San Jose, CA (US)

(72) Inventors: Karl Anton Hennig, Campbell, CA (US); Ajay Aswal, Fremont, CA (US); Bisrat Zerihun, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 168 days.

(21) Appl. No.: 17/127,700

(22) Filed: Dec. 18, 2020

(65) Prior Publication Data
US 2022/0197952 A1   Jun. 23, 2022

(51) Int. Cl.
*G06F 16/9032*   (2019.01)
*G06F 16/9035*   (2019.01)
*H04L 51/02*   (2022.01)
*H04L 51/216*   (2022.01)

(52) U.S. Cl.
CPC .... *G06F 16/90332* (2019.01); *G06F 16/9035* (2019.01); *H04L 51/02* (2013.01); *H04L 51/216* (2022.05)

(58) Field of Classification Search
CPC ........... G06F 16/90332; G06F 16/9035; H04L 51/216; H04L 51/02
USPC .......................................................... 704/9
See application file for complete search history.

(56) References Cited

U.S. PATENT DOCUMENTS

| 2015/0032443 | A1  | 1/2015  | Karov et al. |
| 2018/0196683 | A1* | 7/2018  | Radebaugh ............ G06F 9/453 |
| 2019/0012390 | A1* | 1/2019  | Nishant .................. G06N 3/006 |
| 2019/0147347 | A1  | 5/2019  | Ng et al. |
| 2019/0354594 | A1* | 11/2019 | Foster .................... G06F 40/56 |
| 2019/0377790 | A1  | 12/2019 | Redmond et al. |
| 2020/0042642 | A1* | 2/2020  | Bakis ..................... G06F 40/35 |

(Continued)

OTHER PUBLICATIONS

Burd, Barry "Beginning Programming with Java For Dummies," 4th Edition, 2014 [Retrieved from the Internet] <URL: http://www.chinhnghia.com/Beginning_Programming_with_Java_For_Dummies_4th_Edition.pdf> p. 128.

*Primary Examiner* — Imad Hussain
(74) *Attorney, Agent, or Firm* — Haynes and Boone, LLP (57) ABSTRACT

Systems and methods for automatic generation of free-form conversational interfaces are disclosed. In one embodiment, a system receives an input from a user device through a conversational graphical user interface (GUI). An intent of the user may be determined based on the received input. Based on the intent of the user, the system may identify, from a plurality of objects available to the system, one or more objects. Each of the plurality of objects has annotations corresponding to one or more elements of the object and one or more functions of the object. The one or more functions corresponding to the one or more elements are executable to perform an action upon corresponding elements. Based on the identified one or more objects and the annotations of the identified one or more objects, the system may generate a dynamic dialogue flow for the conversational GUI, where the dynamic dialogue flow is generated in real-time during a conversational GUI session.

20 Claims, 6 Drawing Sheets

(56) References Cited

U.S. PATENT DOCUMENTS

2020/0218995 A1    7/2020   Neogi et al.
2020/0322320 A1   10/2020   Moon et al.

* cited by examiner

FREE-FORM, AUTOMATICALLY-GENERATED CONVERSATIONAL GRAPHICAL USER INTERFACES

TECHNICAL FIELD

The present disclosure generally relates to conversational graphical user interface methods, software, and systems and more particularly to free-form, automatically-generated conversational graphical user interfaces.

BACKGROUND

Conversational graphical user interfaces (GUIs) allow users to get information and complete actions through their electronic devices in a natural language, conversational manner. Conversational interfaces may be included in websites, social networks, mobile applications, text messaging platforms, and other locations or applications. In some cases, conversational GUIs may be represented as voice assistants, chat bots, instant messaging bots, and interactive agents, all of which may be implemented as software applications that mimic communicating with a real human where various formats for inputs and/or outputs can be used. Traditionally, creating conversational GUIs has been expensive and error-prone, and has required a lengthy development process. The burdens associated with creating conversational GUIs may be due in part to the requirement to build an entirely separate layer in the conversational GUI based on each of the actions a user wishes to perform. Furthermore, prior conversational GUIs are difficult to maintain. For example, each time that product functionality changes (i.e., the product, of which the conversational interface allows the user to interact, changes), a conversational layer must be built, updated, and/or tested. Thus, there exists a need in the art for techniques that allow for a central implementation where dialogue flows in conversational GUIs can be automatically generated.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Conversational GUIs provide users with the ability to interact with computing devices using natural human language rather than using syntax-specific commands or only clicking icons. For example, conversational GUIs allow users to get information and complete actions through their computing devices using colloquial language that, but for conversational GUI technology, would have been unrecognizable by a computing device. Conversational GUIs may be implemented in social networks, mobile applications, instant messaging platforms, websites, operating systems, and other locations or applications that would allow a user to benefit from the convenience of interacting with a conversational GUI. In some cases, conversational GUIs may be represented as voice assistants, chat bots, instant messaging bots, and interactive agents, each of which may be implemented as software application(s) that mimic communicating with a real human. Conversational GUIs may accept inputs and output responses in various formats such as textual inputs and/or outputs, auditory inputs and/or outputs, video-captured inputs (e.g., via facial movement or other gestures) and video or other animated output. While reference is made to conversational GUIs herein, it will be appreciated that the concepts described may be implemented in non-graphical user interfaces such as in voice-only systems. Traditionally, creating conversational GUIs has been expensive and error-prone, and has required a lengthy development process. For example, when creating a conversational GUI, an entirely separate layer in the conversational GUI often must be built based on each action that is to be made available to the user when interacting with the conversational GUI. Relatedly, conventional conversational GUIs have been difficult to maintain once created. For example, each time that product functionality changes (e.g., the product, with which the conversational GUI allows the user to interact, changes), the conversational layer must be updated and tested. For example, the conversational layer may be tested for interoperability with other conversational layers.

The present disclosure provides for a central implementation where a conversational GUI can be automatically generated such that dynamic dialogue flows are created in real-time as a user interacts with the conversational GUI. Rather than starting with actions that users wish to perform and implementing an interface for them separately from the rest of the product like in traditional approaches, the present disclosure illustrates an object-entity model where the object-entity model represents objects in the user's domain and dialogue flows are created dynamically by referring to the object-entity model. For example, the objects may be labeled items such as "account," "transactions," and so forth. By annotating an object's code and adding configuration to the object's methods (e.g., the object's functions), actions that can be performed for the object may be defined in a way that would allow a dialogue flow for a conversational GUI to be automatically generated in real-time during a session based on the annotations and configurations in the core object-entity definitions. Thus, the need for implementing a separate interface layer for the conversational GUI for each user action can be reduced or eliminated.

In an embodiment of the present disclosure, an identifier for each object, an identifier for each action (e.g., method, function) on the object, and an identifier for each data element or parameter needed for the action to succeed may be mapped to an entry in a content management system. Each identifier in the entry in the content management system may be mapped to information such as a name and text labels in different languages corresponding to the name. A linguistic artificial intelligence engine may be trained on the data in the content management system so that a user's intent can be accurately matched with the name and thus the identifiers in the content management system. At runtime, an entire graph of objects may be made available to a system such that the system can automatically generate a dialogue flow for a conversational GUI, where the dialogue flow may be a wrapper/interpreter that refers to the graph of objects and matches user input to entities in the graph. For example, the user input can be interpreted to mean an intent that can be matched to a name. Based on the identifier(s) mapped to the name, the system can identify object(s), function(s), element(s), and parameter(s) associated with the identifier(s) and generate a dialogue flow based the annotations of the identified object(s), action(s), element(s), and/or parameter(s).

In another embodiment, the system may receive an input from a user through a conversational GUI on a user device. The system may interpret the input along with the context associated with the input to determine an intent of the user (e.g., an intent of the user input or user request). Based on the intent of the user, the system may identify, from the graph of objects available to the system at runtime (either in its entirety or a subset of objects), one or more specific objects that correspond to the determined intent of the user. For example, the system may identify an object by matching the intent of the user to an identifier of the object, an identifier for a function of the object or parameters of the function, and/or identifiers for elements of the object. Based on the identified one or more objects and the annotations (e.g., metadata) thereof, the system may generate a dynamic dialogue flow for the conversational GUI.

Figure 1:
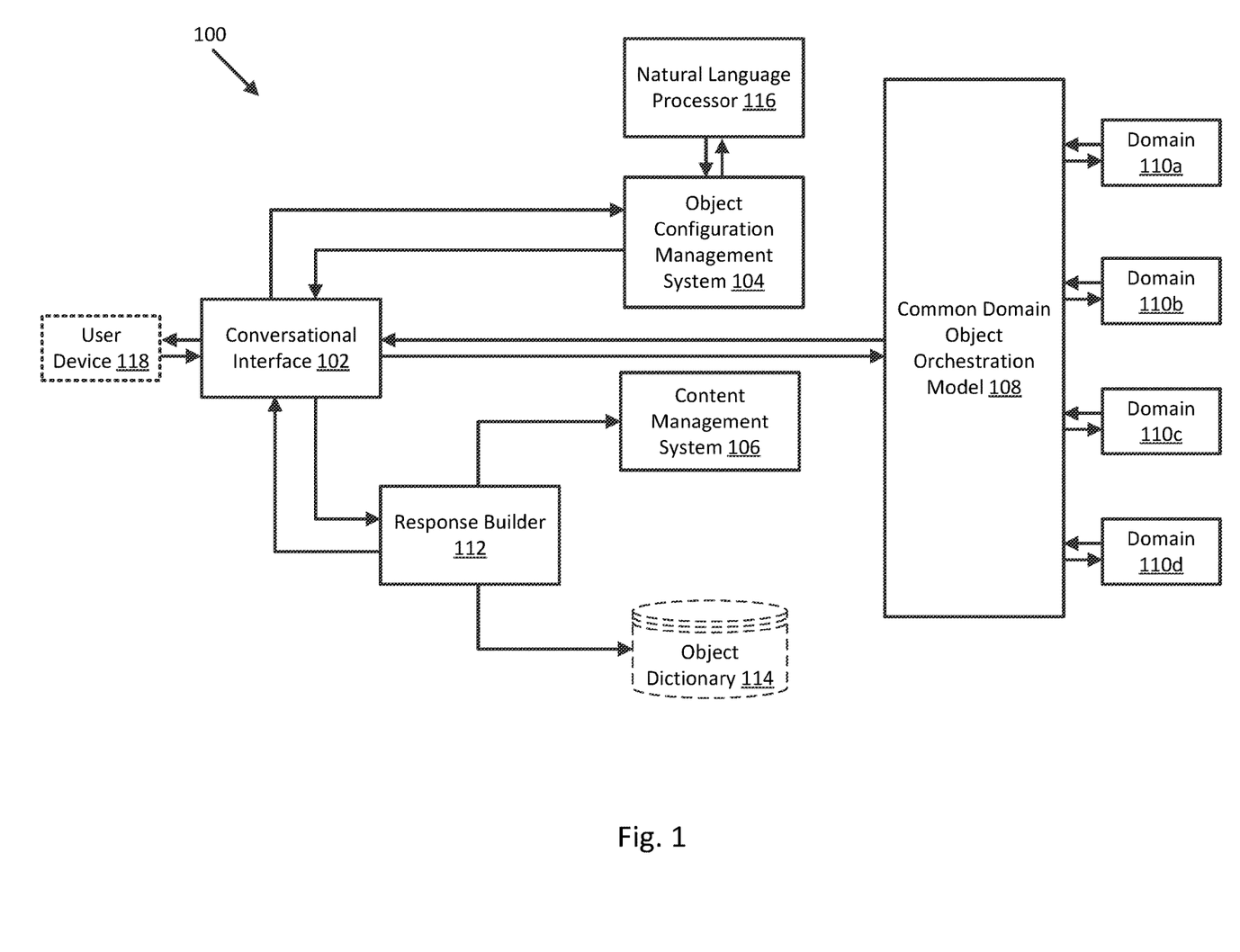
FIG. 1 illustrates a block diagram of an example system that automatically generates dynamic dialogue flows for conversational GUIs in accordance with one or more embodiments of the present disclosure.

FIG. 1 illustrates a block diagram of an example system 100 that automatically generates dynamic dialogue flows for a conversational GUI 102. The system 100 includes functionality and structure associated with receiving inputs from a user device 118 participating in a session (e.g., chat bot session) with the system 100 through the conversational GUI 102, determining an intent of the user associated with the user device 118, based on the received user inputs, identifying one or more objects from a plurality of objects available to the system based on the intent of the user, and generating a dynamic dialogue flow for the conversational GUI 102 based at least in part on the one or more identified objects and their annotations (e.g., metadata that may describe what parameters, if any, are needed to perform an action on/with the object). The system 100 includes the conversational GUI 102, a natural language processor 116, an object configuration management system 104, a response builder 112, a content management system 106, a common domain object orchestration model 108, domains 110a-110d, and an object dictionary 114. While illustrated separate from one another, one or more of the aforementioned components may be combined within a single component or system, or may be implemented separate from one another, including at different systems and/or at remote components. For example, the object dictionary 114 may be stored in a cache memory component of user device 118 to reduce the cost for the user device 118 to access data during a use of the conversational GUI 102.

The conversational GUI 102 may provide users with the ability to interact with the system 100 using natural, conversational language. The conversational GUI 102 may be accessed via a website, a web service interaction (e.g., live chat), an application (e.g., a client application or mobile application on the user device 118), or it may be a part of a virtual assistant application or function of an operating system of the user device 118. While some or all the automatic generation of conversational interfaces as discussed herein may be performed by the system 100, in some cases, the system may cause a client-side portion of the conversational GUI 102 to execute at user device 118 where inputs may be provided and responses may be outputted for a user associated with the user device 118.

The natural language processor 116 may perform operations associated with understanding and interpreting inputs received from the user through the conversational GUI 102. Various natural language processing engines may be implemented such as Amazon Comprehend, MonkeyLearn, Aylien, IBM Watson, Google Cloud NLP API, NLTK, Stanford Core NLP, TextBlob, SpaCy, and GenSim, as well as proprietary solutions specific to an application or service. Natural language processor 116 may process inputs received by the conversational GUI 102 as well as the contextual information associated with the input such as inputs received prior to the input, previous system-generated responses, and historic conversation flows to determine a present intent of the user.

The object configuration management system 104 may store a mapping of the different recognizable intents of the user and objects (and object elements or functions) in the domains 110a-110d. In other words, the object configuration management system 104 may manage a configuration of actions that are available to a user who is interacting with the conversational interface 102 and the object elements and functions that are there to support those actions. The mapping may be stored using identifiers where an intent may have a specific associated identifier and the objects, elements, and functions corresponding to that intent may be tagged with the identifier. At a domain level (e.g., domains 110a-d), annotations may be added at the element and function (e.g., field and method) level for objects of the domains 110a-d. Object configuration management system 104 may parse (e.g., scan) through the objects of the domains 110a-d to create the mapping of domain capability (intent) and elements/fields needed to support that capability and functions available to perform that capability. The parsing and updating performed by the object configuration management system 104 may be performed offline and at intervals such as periodic intervals. A mapping between the content entry and the capability may be maintained in object configuration management system 104. Content related to the capability may be added to the content management system 106 as a content entry. Object configuration management system 104 may maintain a mapping to the content entry in the content management system 106.

Domains 110a-110d may include different user domains available to a user. For example, domains 110a-110d may include a user account domain, a financial instrument domain, a dispute resolution domain, a transactions and statements domain, as well as other domains associated with a user account of the user. Although FIG. 1 illustrates four domains, there may be more or less domains according to various implementations. Using a central implementation as discussed herein, development teams may focus on developing their corresponding domains where their specific domain can be updated or changed without affecting the other domains of the other development teams since all of the domain objects are made available to the system 100 at runtime and dialogue flows for conversational GUI 102 are automatically generated by referring to the individual domain objects and their annotations.

In some embodiments, object configuration management system 104 may determine that one or more of domains 110a-d has been updated based on a change in the annotations made to an object of the updated domain(s). The annotations may define an element of an object and the corresponding function of the object. The object configuration management system 104 may parse the annotations for metadata that indicates how to interact with the elements and functions. For example, the metadata may indicate the acceptable parameters that are required to successfully execute a function that affects a corresponding element. Thus, in the development process, annotations may be syntactic metadata that can be added to source code at the domain level to provide supplemental information about how to interact with the objects and their elements and functions. Thus, instead of manually creating new dialogue flows for a conversational GUI each time an object is added or updated, dialogue flows can be dynamically generated at runtime while a chat session is ongoing by simply referring to the annotations and creating responses from static responses and dynamic placeholders that can be filled in based on the reference to the annotations.

Response builder 112 may be a real-time processing system that retrieves input from content management system 106 and object dictionary 114 to generate responses to be outputted in the conversational GUI 102. Content management system 106 may store content entries that include static responses that have dynamic placeholders configured to be filled with object-specific items such as text strings corresponding to object elements or text strings corresponding to parameters required for functions to execute successfully. For example, in response to "what phone number is on my account?" inputted by a user, the response builder 112 may respond with: "You have only one active phone <$phone_element> on your account," wherein "<$phone_element>" is a dynamic placeholder that may be filled in from a string of an element of an object from the object dictionary 114. In this regard, the object dictionary 114 may store the different domain object elements and their corresponding functions. In some embodiments, the object dictionary 114 may be loaded in a cache memory of the user device 118 when a new conversation session is established so that responses can quickly be generated for a user. The response builder 112 may receive from the object configuration management system 104 identified objects from which a response will be generated. The response builder 112 may call the content entry corresponding to the object(s) from the content management system 106 to gather the content information required to generate a static response where any dynamic placeholder in the static response can be filled with strings stored in the object dictionary 114. The strings may correspond to elements, functions, and parameters, for example.

Common domain object orchestration model 108 may parse domains 110a-d to fetch domain objects and their functions (e.g., getters, setters, etc.) specific to the user. For example, while there may be many users that interact with the system 100, the information at the domain level may be retrievable specifically for each user. Common domain object orchestration model 108 may be called from the conversational GUI 102 at the start of a session to load objects specific to the user into a memory of the user device 118 so that data may be accessed quickly by the user device 118. In one embodiment, the user may be authenticated before the objects specific to the user can be loaded into the memory of the user device 118. For example, the user device 118 can provide one or more credentials of the user such as a username, password, and/or token and the one or more credentials can be used to authenticate the user and determine the user profile corresponding to the credentials. This authentication may be done automatically such as when the user logs into their user account (e.g., logs in on a website or client application) before engaging with the conversational GUI 102 or through the conversational GUI 102 at startup such as through a login process where login credentials are requested from the user to verify the user's identity.

Figure 2A:
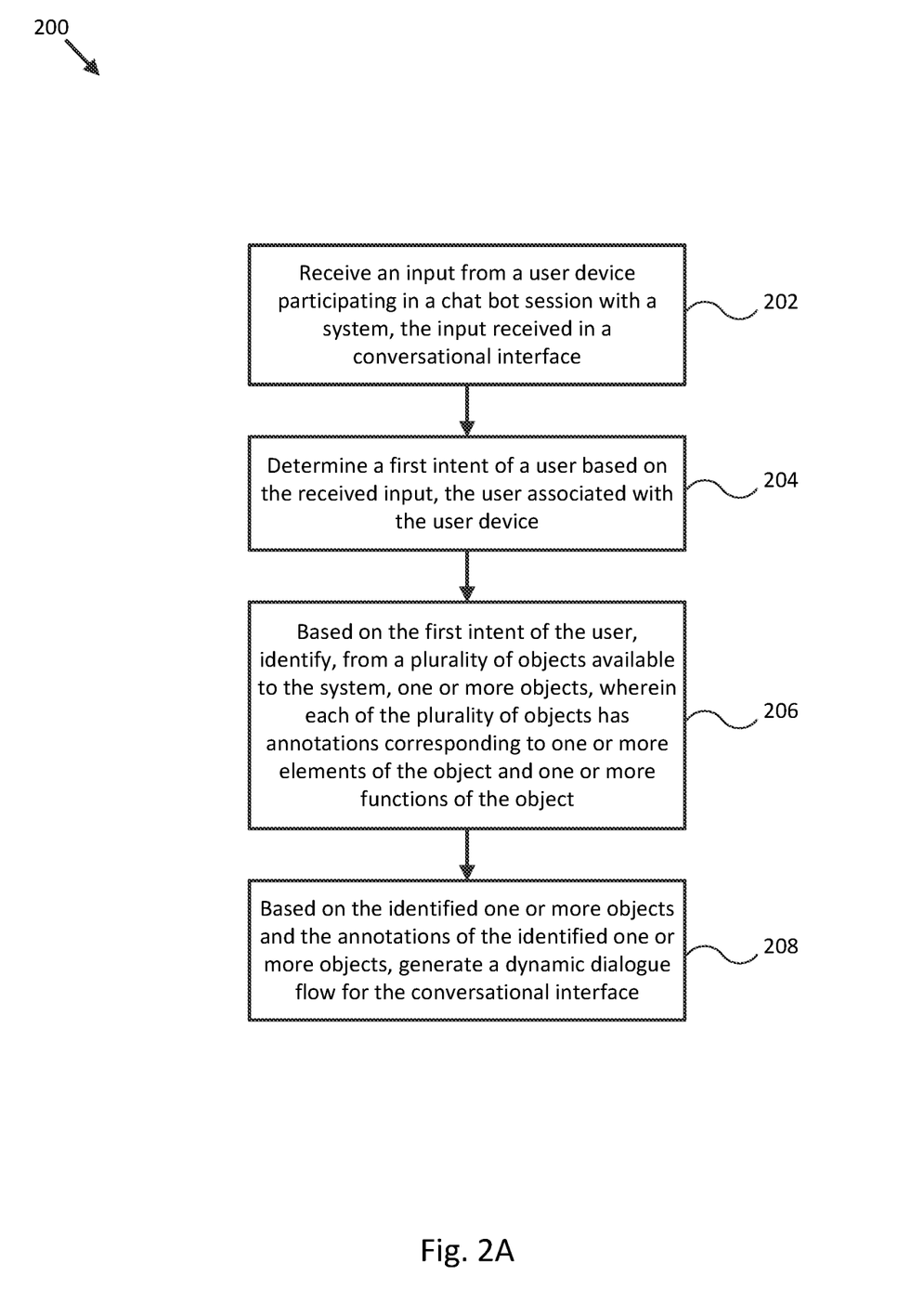
FIG. 2A illustrates a flow diagram of a process for automatically generating dynamic dialogue flows in conversational GUIs in accordance with one or more embodiments of the present disclosure.

Referring now to FIG. 2A, illustrated is a flow diagram of a process 200 for automatically generating free-form conversational GUIs in real-time in accordance with one or more embodiments of the present disclosure. For explanatory purposes, the process 200 is primarily described herein with reference to FIG. 1; however, the process 200 is not limited to FIG. 1 and may generally be implemented in view of the additional figures of the present disclosure. For example, although the process 200 is described as being performed by the system 100 of FIG. 1, it will be appreciated that the process 200 may be performed, for example, by any suitable system, environment, software, and/or hardware as appropriate. For example, a conversational GUI generation system comprising a communications device, at least one non-transitory memory storing instructions and other required data, and at least one hardware processor coupled in an interoperable fashion to the at least one non-transitory memory and the communications device can be used to perform the process 200. The blocks of the process 200 are described herein as occurring in serial, or linearly (e.g., one after another). However, multiple blocks of the process 200 may occur in parallel. In addition, the blocks of the process 200 need not be performed in the order shown and/or one or more of the blocks of the process 200 need not be performed.

At block 202, the system 100 may receive an input from a user device 118 associated with a user. For example, the user device 118 may be a client device participating in a client-server session (e.g., chat bot session, voice assistant session, etc.) with the system 100 where conversational GUI 102 is able to facilitate interactions between the user and the system 100. Conversational GUI 102 may accept inputs and/or output responses in various formats including textual inputs/outputs, auditory inputs/outputs, video-captured inputs (e.g., facial movement inputs and other gesture inputs) and/or video/animated outputs. Examples of inputs may include a question, a query, a comment, a selection of a choice presented in the conversational GUI 102 (e.g., "YES," "NO" or other button options selectable in a dialogue flow). In addition to output responses provided through the conversational GUI 102, the system 100 may generate backend responses such as executing functions as discussed herein.

At block 204, the system 100 may determine a first intent of the user based on the received input. In some embodiments, the system 100 may determine the first intent of the user based on the received input and the contextual information from the user's interactions with the conversational GUI 102. For example, the system 100 may acquire the user's previous inputs to the conversational GUI 102 during the server session and/or historic conversations between the user and the system 100 recorded by the system 100 to determine contextual information that can be used as a basis for determining the user's present intent. In one embodiment, the natural language processor 116 may determine the first intent of the user based on the received input where the first intent may be represented by a name, text label, or other identifier. For example, the output from the natural language processor 116 may be a message string describing the intent of the received input or a code that corresponds to a particular intent. For example, the message string may be "account change" or "transaction view." In another example, the code can be "f8a9h9" which may correspond to a particular intent such as "account change." The message string and/or code may be the identifier associated with the intent, which can be tagged to various objects, elements, and functions to map them to the intent.

In some embodiments, a natural language processing model may be implemented with Amazon Comprehend, MonkeyLearn, Aylien, IBM Watson, Google Cloud NLP API, NLTK, Stanford Core NLP, TextBlob, SpaCy, and GenSim, as well as proprietary solutions where the natural language processing model can learn which user inputs and contextual information correspond to specific intents. For example, as more users engage with the conversational interface 102 and/or there are more interactions with the conversational interface 102, feedback can be generated based on the user inputs and their conversational contexts and the actions that users end up taking on various objects. This feedback may be formatted into data structures that the natural language processing model may learn from so that it may become more accurate in determining user intent over time. In some embodiments, the objects (and elements and functions thereof) that the user ultimately interacts with may be automatically tagged with an identifier associated with the determined intent, thus creating a mapping between the object, element, and/or function and the determined intent. This may be performed in cases where the determined intent has new characteristics relative to previously known/stored intents, and the determined intent can be made into a new standalone intent that can be mapped to its own object, elements, and/or functions.

At block 206, based on the first intent of the user, the system 100 may identify, from a plurality of objects available to the system 100, one or more objects (and their elements or functions) from which a dynamic dialogue flow can be generated. To identify the objects, in various embodiments, the system 100 may first identify a tag identifier associated with the first intent of the user. For example, when the first intent of the user is determined, the system 100 may view the assigned tag identifier associated with the first intent. The tag identifier associated with the first intent of the user may be used to identify relevant objects (e.g., JSON objects or other data objects) and elements or functions of those objects. For example, all objects (and their elements and functions) in an object-entity model may have been tagged with tag identifiers that are mapped to possible intents of the user and may be made available to the system 100 at runtime. Any of the objects, elements, or functions tagged with the tag identifier associated with the first intent may be identified such as by performing a lookup in the object configuration management system 104 where the mappings between intents and objects, elements, and functions are stored.

For example, the first intent determined at block 204 may have a corresponding tag identifier, which for illustrative purposes may be "8ahf0a8f." The system 100 may scan through the plurality of objects available to the system 100 (e.g., in the object configuration management system 104) for particular objects (and their elements and/or functions) that have been tagged with the "8ahf0a8f" identifier to identify objects that are mapped to the first intent. For example, a lookup in the object configuration management system 104 for objects that have been tagged with the "8ahf0a8f" identifier and thus mapped to the first intent may be performed. In some cases, tag identifiers may be part of the annotations of an object, an object element, or an object function.

The following is an exemplary illustration of block 206. The user may input to the conversational GUI 102: "How do I change my email address in my account?" The first intent of the input may represent the question, query, action, or information associated with the input and can be determined using a suitable natural language processing method. Thus, the natural language processor 116 may determine that the first intent is associated with changing an account's email address. The first intent associated with changing an account's email address may have a corresponding tag identifier that will be used to look up objects, elements, and functions tagged with that identifier. For example, a lookup in the object configuration management system 104 may provide the objects, elements, and functions tagged with the tag identifier corresponding to the first intent and thus mapped to the first intent.

At block 208, based on the identified one or more objects from block 206 and the annotations of the identified one or more objects, the system 100 may generate a dynamic dialogue flow for the conversational GUI 102. In some embodiments, each, or at least some, of the identified objects may have annotations corresponding to one or more elements of the object and one or more functions of the object. The system 100 may parse the annotations of an object for syntactic metadata that defines how a dialogue flow can be generated to allow a user to interact with the element(s) and the function(s) of the object.

For example, in a case where one object is identified at block 206, and one function of the object corresponds to the first intent, the system 100 may generate a dynamic dialogue flow for the conversational GUI 102 based on the annotations of the function. For example, as part of the dynamic dialogue flow and in response to the input received at block 202, the response builder 112 of the system 100 may retrieve the content entry corresponding to the function from the content management 106 by referring to the mapping between the function and the content entry stored in the object configuration management system 104 and based on the annotations of the function, determine what parameters are required to execute the function. For example, the annotations may indicate that additional input is required from the user to execute the function. The additional input from the user may be required as an input parameter of the function. As such, the content entry retrieved from the content management system 106 for the function may be outputted in the conversational GUI 102 to prompt the user for the additional input to be used as the parameter for the function. In some embodiments, the prompt may include a static portion such as default text and a dynamic portion that can be filled in with any relevant information such as text corresponding to an object element that corresponds to the function. For example, the dynamic portion can be filled in by the response builder 112 by retrieving, from the object dictionary 114, the text corresponding to the object element, which will be specific to the user interacting with the conversational GUI 102.

The following is an illustration of the process 200. The system 100 may receive the following user input from the user in the conversational GUI 102: "I want to change my email address." The system 100 may determine an intent of the user to change his/her email address. Based on the intent of the user, the system 100 may identify an object that has been mapped to the intent of the user (e.g., has a tag identifier that matches the tag identifier of the intent) by referring to the mappings in the object configuration management system 104. A specific function and element of the object may have been tagged with the tag identifier matching the intent. For example, a "change email address" function and an "account email address" element corresponding to the function may have been tagged with the tag identifier matching the intent. The object configuration management system 104 may determine what parameters are needed to execute the "change email address" function. For example, a replacement email address provided by the user may be needed to execute the "change email address" function. The object configuration management system 104 may request the response builder 112 to generate a response as part of a dynamic dialogue flow by retrieving content from a content entry corresponding to the "change email address" function stored in the content management system 106. For example, the response may be "Your current email address is <$current_email_address>, what would you like to change it to?" Wherein, the dynamic portion indicated can be filled in with the text of the object element specific to the user. Once the additional input is received from the user, the system 100 may execute the function to change the email address to the replacement email address. In some embodiments, reference may be made to the annotations for any additional restrictions or rules that the additional input must satisfy in order for the function to be successfully executed by the system 100. For example, one restriction may be that the email address must include an "@" to be considered in the correct format for an email address. In some cases, where the input provided by the user does not satisfy the parameter restrictions or rules, the response builder 112 may generate a response prompting the user for input that satisfies the restriction or rule.

In some embodiments, where there is more than one object identified, the response builder may generate a response asking the user to specify which object that the user would like to interact with. For example, the response may list each of the identified objects and allow the user to select the object that the user intended to interact with in submitting their recent user input. In some cases, the selection made by the user may be used as a data point for feedback for machine learning to identify objects more accurately based on a determined intent from a user input.

The following is another illustration of the process 200. The system 100 may receive the following input in the conversational GUI 102 from the user: "How do I change my email address in my account?" The system 100 may determine the intent of the user is to change an email address and may identify a "contact information" object that is mapped to such intent. However, within a "contact information" object in the "account" domain there may be a "change" function and two elements tagged with an identifier associated with the user's first intent. For example, a "Primary Email Address" element and a "Secondary/Recovery Email Address" element may both be tagged with the identifier associated with the user's first intent. The response builder 112 may generate a response based on the annotations of the "change" function which may require a parameter for which email address to change. The response builder 112 may request content related to the "change" function from content management system 106 (using an identifier for the "change" function that is mapped to a content entry in the content management system 106) to generate a response in the conversational GUI 102.

For example, the response builder 112 may generate a response in the dialogue flow of the conversational GUI 102 requesting the user to select which email address to change. To illustrate, the response builder may prompt the user with: "Would you like to change <$primary_email> or <$secondary_email>?" The prompt may comprise the static portions acquired from the content entry in the content management system 106 and dynamic portions that are filled in by calling to the object dictionary 114 for the element values specific to the user account. When the user provides a response indicating which email to change, the system 100 may execute the function of the object on the element of the object. In some cases, execution of the function may still require additional input through the dynamic dialogue flow based on annotations describing the parameters of the function so that the parameters required to execute the function can be obtained from the user. In the aforementioned example, the dynamic dialogue flow may generate a prompt that requests the user to input the new email address to replace the previous email address as one of the parameters to execute the function for changing the email address.

The following is a further illustration of the process 200 when there is more than one object identified. Where there is more than one object identified, the system 100 may generate a dialogue flow to extract a second intent of the user based on additional received input. For example, if a user has inputted into the conversational GUI 102 the following: "change account info," the system 100 may determine a first intent of the user corresponding to changing his/her account information, however, there may be a plurality of objects that the system 100 identifies as being tagged with a tag identifier corresponding to the first intent of changing account information. For example, there may be objects such as "contact information," "account settings," "account privacy," and so forth, and each object may have been tagged with a tag identifier corresponding to the first intention of changing account information. In such cases, the response builder 112 may generate a response based on the annotations of the objects where the response can be used to narrow the user's intent to a more specific object, element, and/or function. For example, the response builder 112 can generate a response such as "What in your account would you like to change?" where the outputted response also lists selectable options corresponding to the "contact information," "account settings," "account privacy," and so forth, which may be text representing the objects and extracted from the annotations of the object. Based on the user's input responsive to the prompt in the conversational GUI 102, a second intent of the user can be determined. Similar prompts may be generated as needed in the conversational GUI 102 to narrow the user's intent further if the user's intent is ambiguous (e.g., there is more than one object, element, and/or function that is mapped to the determined intent of the user).

Based on the second intent of the user, the system 100 may identify an object from the set of one or more objects that were originally identified for the first intent. For example, the user may respond to the aforementioned prompt by selecting the option "contact information." In some embodiments, the system 100 may scan through each of the elements in "contact information" and if there is more than one element for the object of "contact information," the response builder 112 may generate a response requesting the user to indicate which element of the "contact information" object that the user wishes to change. That is, a further intent may be determined. For example, the object of "contact information" may have elements such as "email address," "phone number," and "mailing address." Based on annotations of such elements, the system 100 may extract textual strings of the elements so that the response builder 112 may generate a response such as "What would you like to change: your email address, phone number, or mailing address?" If the user responds with "phone number," the system 100 may identify that the user wants to change the "phone number" element as a further intent. According to various embodiments, the dialogue flow may be a text chat where the user can respond to the above prompt by typing their response in the conversational GUI 102 or selecting a generated button of the prompt in the conversational GUI 102 for "phone number." In some embodiments where the conversational GUI 102 accepts auditory input, the user may respond by vocalizing his/her selection. If a function tagged with a tag identifier corresponding to changing the "phone number" element is the final identified function after narrowing the user's intent, a dialogue flow can be generated based on the annotations of the function and the function can be executed by the system 100 when appropriate (e.g., such as after the user has provided any required input parameters to execute the function). Continuing the previous example, the response builder 112 may scan through the annotations of the "phone number" and/or the corresponding "change" function to determine what, if any, parameters are needed to execute the "change" function on the "phone number" element. For example, the annotations on the "change" function corresponding to the "phone number" element may require a user input of a new phone number to replace the current phone number. Based on the annotations, the response builder 112 can generate a prompt that includes a static portion and a dynamic portion. For example, the response builder 112 may provide a prompt that states: "Please enter a phone number to replace your current phone number of <$phone_number>." Wherein the <$phone_number> dynamic placeholder can be filled in by the response builder 112 by calling to the object dictionary 114 for the specific phone number of the user's account.

After the user provides an input responsive to the prompt, the system 100 may confirm that the input is acceptable as the parameter for the "change" function corresponding to the "phone number" element such as by referring to any rules set forth in the annotations of the element and/or the function. If the user input is in an acceptable format, the system 100 may execute the function to change the phone number by inputting the user input as the parameter of the function. In some cases, once the function has been completed, the response builder 112 may generate a confirmation response to provide notice to the user that the requested action has been completed. The confirmation response may further be generated based on the annotations and/or reference to the object, element, and/or function. Continuing with the above example, the confirmation response from the response builder 112 may be "We have changed your phone number to <$phone_number>," wherein the call to the "phone number" element now returns the replacement phone number that the user inputted after execution of the "change" function changed the previous "phone number" element.

The following is a further example use case of the process 200. The system 100 may receive an input from the user device 118 stating: "I want to dispute a transaction." The system 100 may determine an intent of the user based at least on the input received but also, if available, any contextual information extracted from the conversation with the conversational GUI 102 prior to the input or any previous conversation that has been recorded by the system 100. Based on the determined intent of the user, the system 100 may match the intent to a "disputes" object and an "initiate dispute" function of the "disputes" object. For example, the object configuration management system 104 may have compared the identifier of the determined intent of the user to objects, elements, and functions available to the system to determine which objects, elements, and functions have been tagged with the identifier and therefore match (e.g., are mapped to the intent). The "disputes" object and the "initiate dispute" function may be passed to the response builder 112 where the response builder 112 may query the content management system 106 for the content entry mapped to the "initiate dispute" function. The content management system 106 may provide a content entry for the "initiate dispute" function, and the annotations of the "initiate dispute" function may indicate the parameters required for the "initiate dispute" function to execute successfully. For example, the annotations of the "initiate dispute" function may indicate that a selection of a "transaction ID" is required from the user. The response builder 112 may then generate a response for the conversational GUI 102 that prompts the user for the "transaction ID." For example, the response may be: "What is the transaction ID for the transaction you would like to dispute?" The response builder 112 may further call to the object dictionary 114 to list each of the transaction IDs associated with the user's account or provide a search feature of the conversational GUI 102 for the user to search and select the desired transaction ID. The user may provide an input indicating the transaction ID of the transaction that he/she wants to dispute. If the input is in an acceptable format for execution of the "initiate dispute" function according to the annotations of the function, the system 100 may execute the "initiate dispute" function. In some cases, where several other parameters are required for the "initiate dispute" function, several more outputs in the dialogue flow of the conversational GUI 102 may be generated to request the additional information from the user similar to how the "transaction ID" was requested. Once the required parameters have been received, the system 100 may execute the "initiate dispute" function.

Figure 2B:
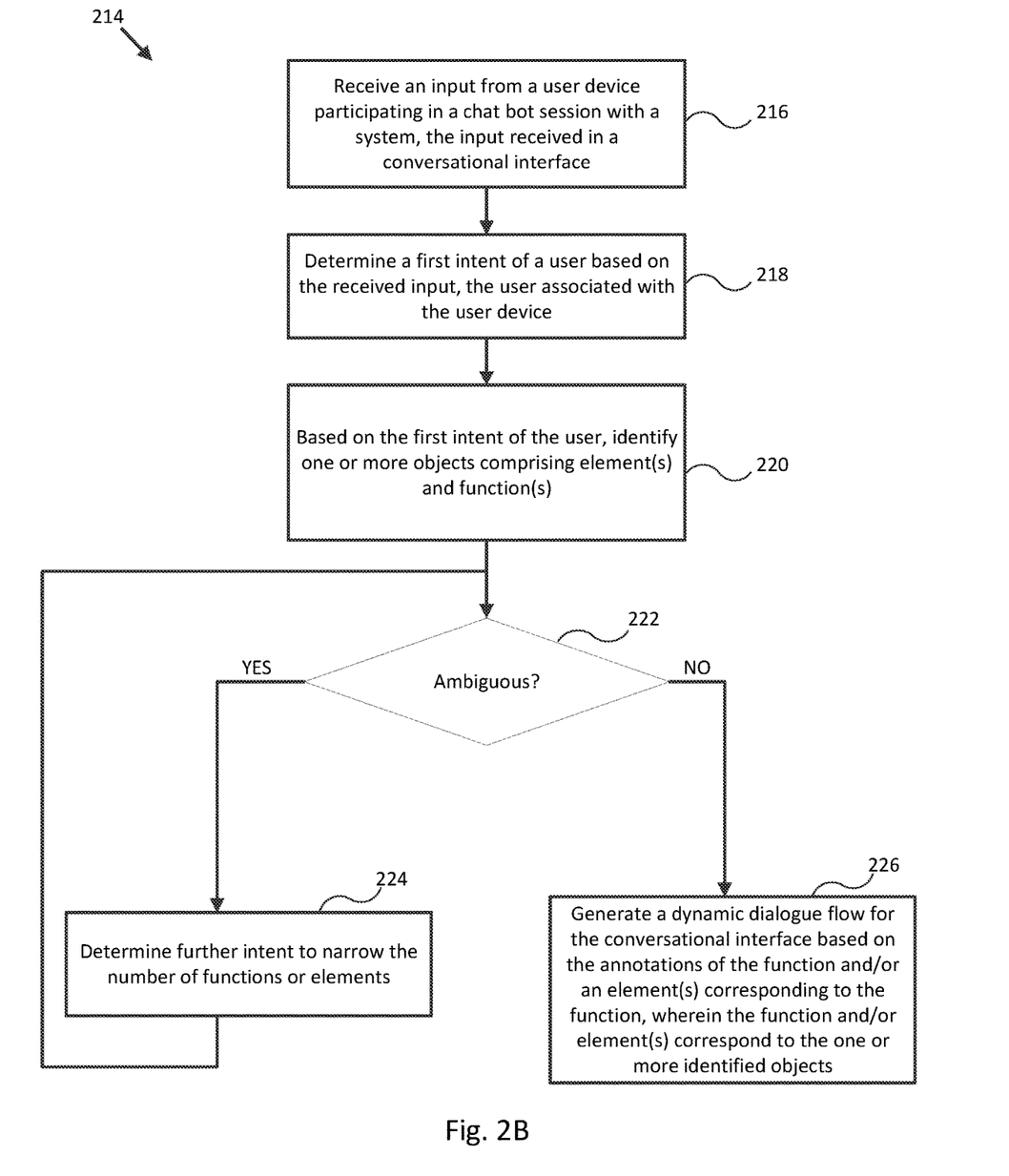
FIG. 2B illustrates a flow diagram of a process for automatically generating free-form conversational GUIs in real-time in accordance with one or more embodiments of the present disclosure.

FIG. 2B illustrates a flow diagram of a process 214 for automatically generating free-form conversational GUIs in real-time in accordance with one or more embodiments of the present disclosure. In FIG. 2B, the system 100 may perform operations at blocks 216 and 218 similar to those discussed at blocks 202 and 204, respectively, in reference to the process 200 of FIG. 2A. At block 220, based on the first intent of the user, the system 100 may identify one or more objects that correspond to the first intent. The one or more objects may include one or more elements and their corresponding functions where certain elements and/or corresponding functions of the identified one or more objects may have a tag identifier that corresponds to the first intent, which may allow the system 100 to similarly identify them at block 220. In this regard, the description of block 206 of FIG. 2A may generally be applied to block 220.

In one or more embodiments, as stated above, an object that is determined to correspond to the first intent, may include a plurality of elements and corresponding functions, however, it may be ambiguous as to which element and/or function (from a plurality of elements and functions corresponding to the object) corresponds to the first intent. In these situations, when there is ambiguity as to which element and/or function corresponds to the first intent (decision block 222: "YES"), the system 100 may proceed to block 224 to determine a further intent of the user to narrow the identified functions and elements to a specific function and element(s) that should be utilized for a dialogue flow provided to the user in the conversational GUI 102.

For example, in one case the user may have inputted to the conversational GUI 102: "How do I change my account contact info?" There may be a plurality of functions of an identified object (e.g., an account information object) that are identified as being mapped to the intent of changing account information. For example, a "change email address" function and a "change phone number" function may have been identified as being tagged with a tag identifier associated with the intent of changing account information. Since there is more than one function identified, the system 100 may determine at decision block 222 that there is ambiguity as to which function the user would like to interact with. Thus, at block 224, the system 100 may determine a further intent to narrow the number of functions to a more specific function that the user would like to interact with. For example, the system 100 may have the response builder 112 generate a response asking if the user would like to change his/her account email address or phone number. For example, the response may be a listed number of choices to choose from where each choice is selectable by the user or the response may request the user to reply with text associated with one of the listed options. If the user replies that he/she would like to change an account email address, either by selection of a button or replying with text that can be analyzed to match within a level of confidence to one of the functions, the system 100 may resolve the ambiguity as to the function with which the user wants to interact (decision block 222: "NO"). If the ambiguity as to the specific element or function has been resolved (such as by determining a further intent as described above) or if there is no ambiguity as to the specific element or function (decision block 222: "NO"), the system proceeds to block 226, where the system 100 may generate a dynamic dialogue flow for the conversational GUI based on the annotations of the specific element(s) and/or the corresponding function of the identified one or more objects as discussed herein. Continuing the above example, the system 100 may generate a dynamic dialogue flow based on the annotations of the "change email address" function and/or the corresponding "email address" element of the identified account information object after the user's intent has been narrowed specifically to the "change email address" function. In other words, the system 100 may generate a dynamic dialogue flow that includes the identified one or more objects configured based on the specific elements and/or corresponding functions.

Figure 2C:
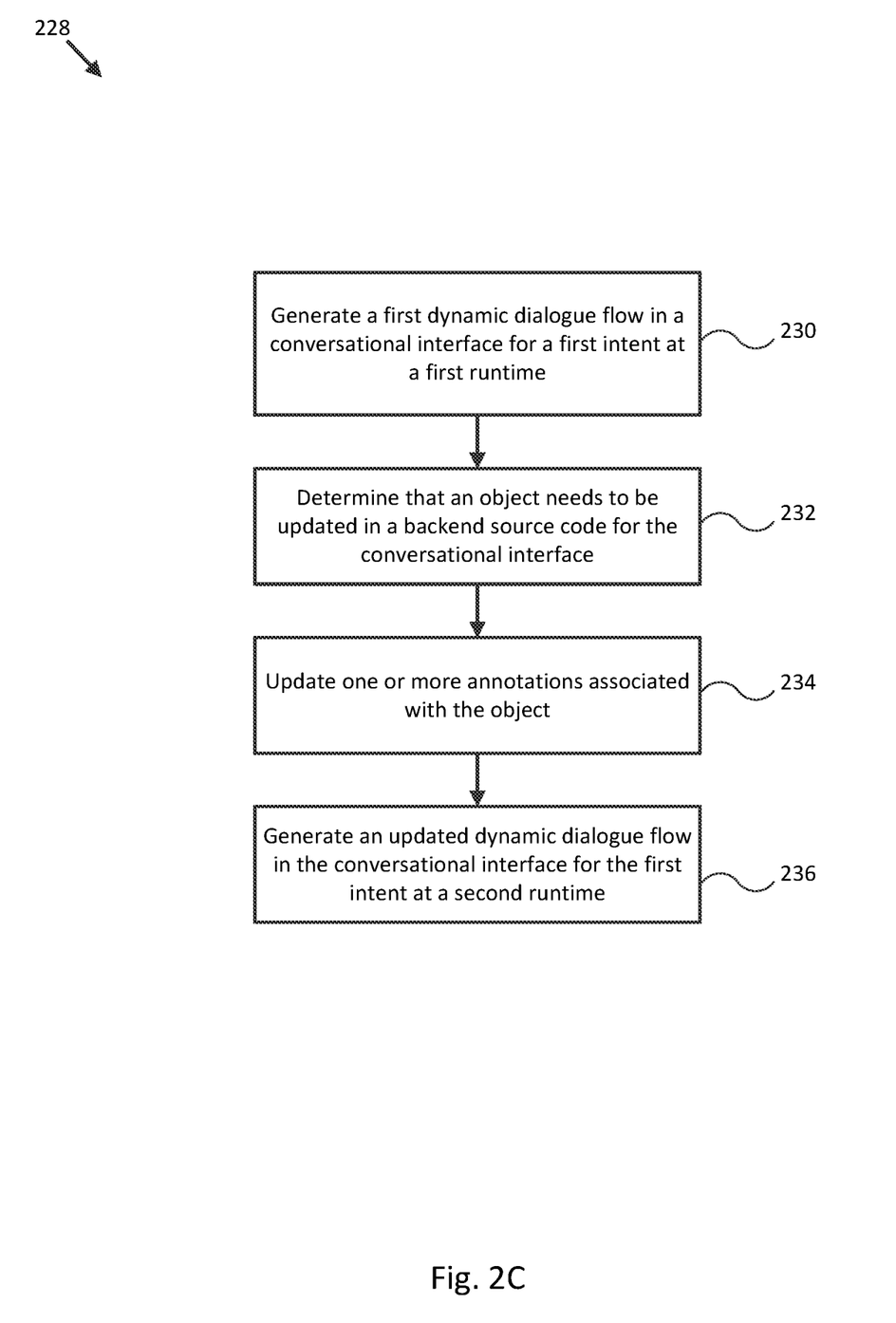
FIG. 2C illustrates a flow diagram of a process for updating free-form conversational GUIs using updates to annotations in backend source code for the conversational GUIs in accordance with one or more embodiments of the present disclosure.

FIG. 2C illustrates a flow diagram of a process 228 for updating a free-form conversational GUI 102 using annotations in backend source code for the conversational GUI 102 in accordance with one or more embodiments of the present disclosure. At block 230, the system 100 may generate a first dynamic dialogue flow for a first intent at a first runtime. For example, the dynamic dialogue flow may be generated for the first intent in the conversational GUI 102 as described above in reference to FIGS. 2A and 2B.

At block 232, an object may be determined to need an update. For example, an element and/or a function of the object may need to be updated (e.g., changed). In another example, the object may need to be updated by adding or removing certain elements or functions to the object. In a further example, the object or its elements and functions may need to be updated to be mapped to a new or different user intent.

At block 234, the object may be updated with annotations that define an element of the object and the corresponding function of the object. In some embodiments, the annotations may further include a tag identifier that allows the object to be mapped to a user intent associated with the tag identifier. The updated annotations may occur in an offline period between the first runtime and a second runtime. In some embodiments, the object configuration management system 104 may determine that the object has been updated based on a detected change in the annotations made to the object. For example, the object configuration management system 104 may parse the annotations for metadata that indicates how to interact with the elements and functions to determine there has been a change in the annotations in relation to a previous parsing of the annotations. In one example use case, the object configuration management system 104 may detect that the metadata of the annotations that indicates the acceptable parameters that are required to successfully execute a function on a corresponding element have changed (e.g., changed to have more or less parameters required for successful execution of the function, changed criteria for parameters to be accepted as input for successful execution of the function, etc.). In another example use case, the object configuration management system 104 may determine the annotations have changed by detecting the inclusion of a new tag identifier that maps the element or function to a new or different user intent.

At block 236, the system 100 may generate a dynamic dialogue flow for the first intent at a second runtime. For example, the annotations may be updated for the object of block 232 such that a new element of the object is mapped to the first intent or a new function of the object is mapped to the first intent. Based on the annotations updated at the object level for the new element or the new function mapped to the first intent, the dynamic dialogue flow may be updated to be different than the dynamic dialogue flow that was generated for the first intent at the first runtime.

For example, the dynamic dialogue flow at the first runtime may have been based on annotations of a first function, but after the update at block 234, the dynamic dialogue flow at the second runtime may have been based on annotations of a second function now mapped to the first intent.

In another example, the dynamic dialogue flow at the first runtime may have been based on annotations of a function that required two input parameters from the user, but after the update at block 234, the annotations of the function may define the function as requiring three input parameters from the user. As such, the dynamic dialogue flow at the second runtime may be different as it will prompt the user for three input parameters so that the function can be executed successfully.

Thus, the present disclosure provides techniques for a central implementation where actions that a user can take are developed and updated on a backend source code and the dialogue flows for a conversational GUI can be generated automatically at runtime by simply referring to annotations in an object-entity model at the backend. In other words, conversational layers for the actions do not need to be built, tested, and/or updated each time product functionality changes as the conversational layer for all actions that are added or updated is centrally implemented. This free-form conversational GUI system allows for a plurality of development teams to work on individual segments to update the conversational GUI functionality without affecting the other development teams.

Figure 3:
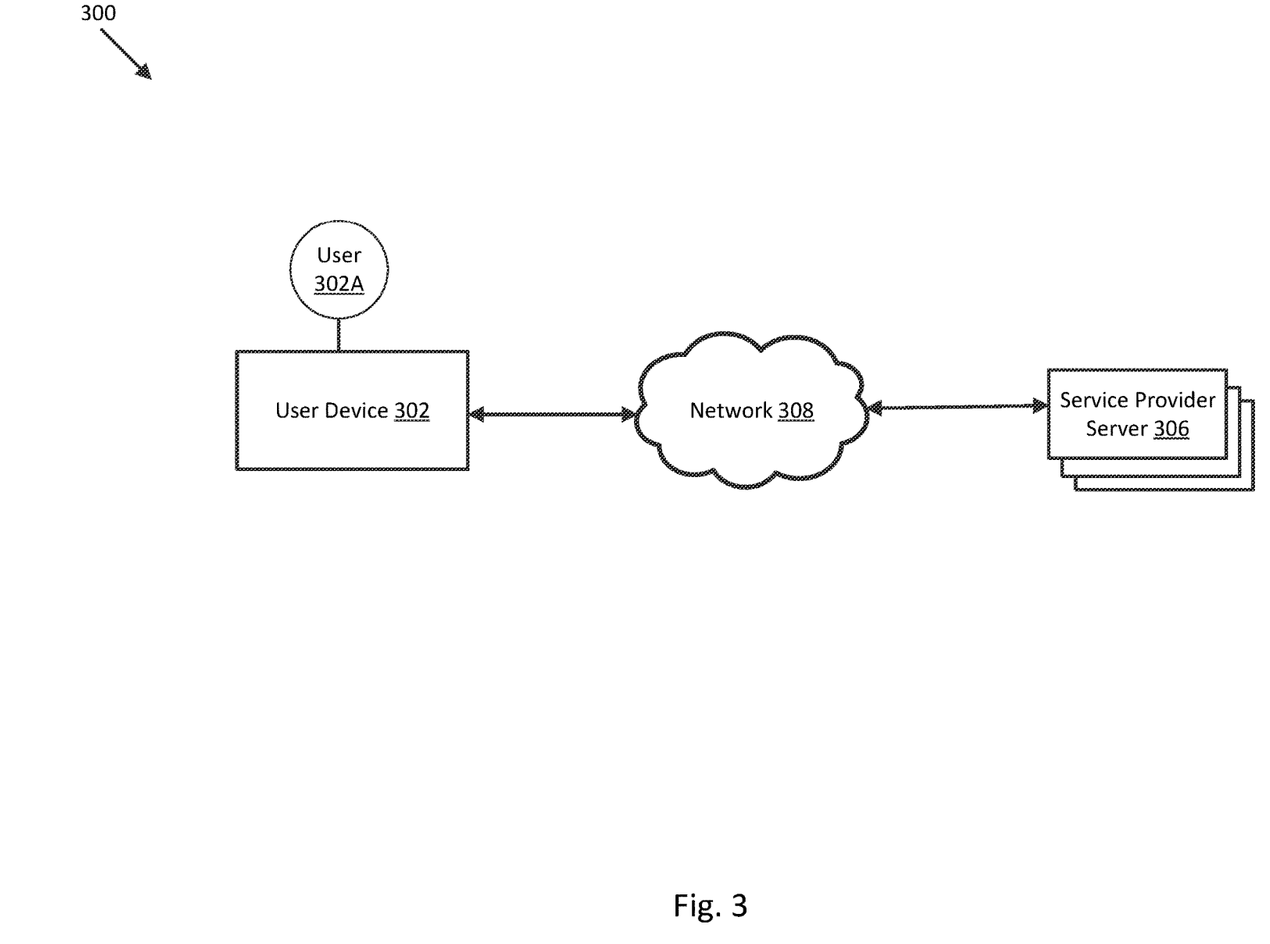
FIG. 3 illustrates a block diagram of a networked system suitable for implementing one or more embodiments of the present disclosure.

Referring now to FIG. 3, a block diagram of a networked system 300 configured to facilitate conversational GUIs in accordance with one or more embodiments of the present disclosure is illustrated. System 300 includes a user device 302, which may be user device 118, and service provider server(s) 306. A user 302A is associated with user device 302, where user 302A can provide an input to service provider server 306 using user device 302.

User device 302 and service provider server 306 may each include one or more processors, memories, and other appropriate components for executing instructions such as program code and/or data stored on one or more computer-readable mediums to implement the various applications, data, and steps described herein. For example, such instructions may be stored in one or more computer-readable media such as memories or data storage devices internal and/or external to various components of system 300, and/or accessible over a network 308 at each of the blocks of process 200 of FIG. 2A. Each of the memories may be non-transitory memory. Network 308 may be implemented as a single network or a combination of multiple networks. For example, in various embodiments, network 308 may include the Internet or one or more intranets, landline networks, and/or other appropriate types of networks.

User device 302 may be implemented using any appropriate hardware and software configured for wired and/or wireless communication over network 308. For example, in some embodiments, user device 302 may be implemented as a personal computer (PC), a mobile phone, personal digital assistant (PDA), laptop computer, and/or other types of computing devices capable of transmitting and/or receiving data, such as an iPhone™, Watch™, or iPad™ from Apple™.

User device 302 may include one or more browser applications which may enable the user device 302 to provide conversational interface capabilities by communicating with service provider server(s) 306 over network 308. For example, in one embodiment, the browser application may be implemented as a web browser configured to view information available over the internet and read aloud any information browsed on websites over the internet. User device 302 may also include one or more toolbar applications which may be used, for example, to provide client-side processing for performing desired tasks in response to operations selected by user 302A. In one embodiment, the toolbar application may display a user interface in connection with the browser application.

User device 302 may further include other applications as may be desired in particular embodiments to provide desired features to user device 302. For example, the other applications may include an application to interface between service provider server 306 and the network 308, security applications for implementing client-side security features, programming client applications for interfacing with appropriate application programming interfaces (APIs) over network 308, or other types of applications. In some cases, the APIs may correspond to service provider server 306. The applications may also include email, texting, voice, and instant messaging applications that allow user 302A to send and receive emails, calls, and texts through network 308, as well as applications that enable the user to communicate to service provider server 306 as discussed above. User device 302 includes one or more device identifiers which may be implemented, for example, as operating system registry entries, cookies associated with the browser application, identifiers associated with hardware of user device 302, or other appropriate identifiers, such as those used for user, payment, device, location, and or time authentication. In some embodiments, a device identifier may be used by service provider server 306 to associate user 302A with a particular account maintained by the service provider server 306. A communications application with associated interfaces facilitates communication between user device 302 and other components within system 300.

Service provider server 306 may be maintained, for example, by an online service provider which may provide conversational interface services. In this regard, service provider server 306 includes one or more applications which may be configured to interact with user device 302 over network 308 to facilitate the conversational interface services as discussed in the present disclosure. Service provider server 306 maintains a plurality of user accounts (e.g., stored in a user account database accessible by service provider server 306), each of which may include account information associated with individual users.

Figure 4:
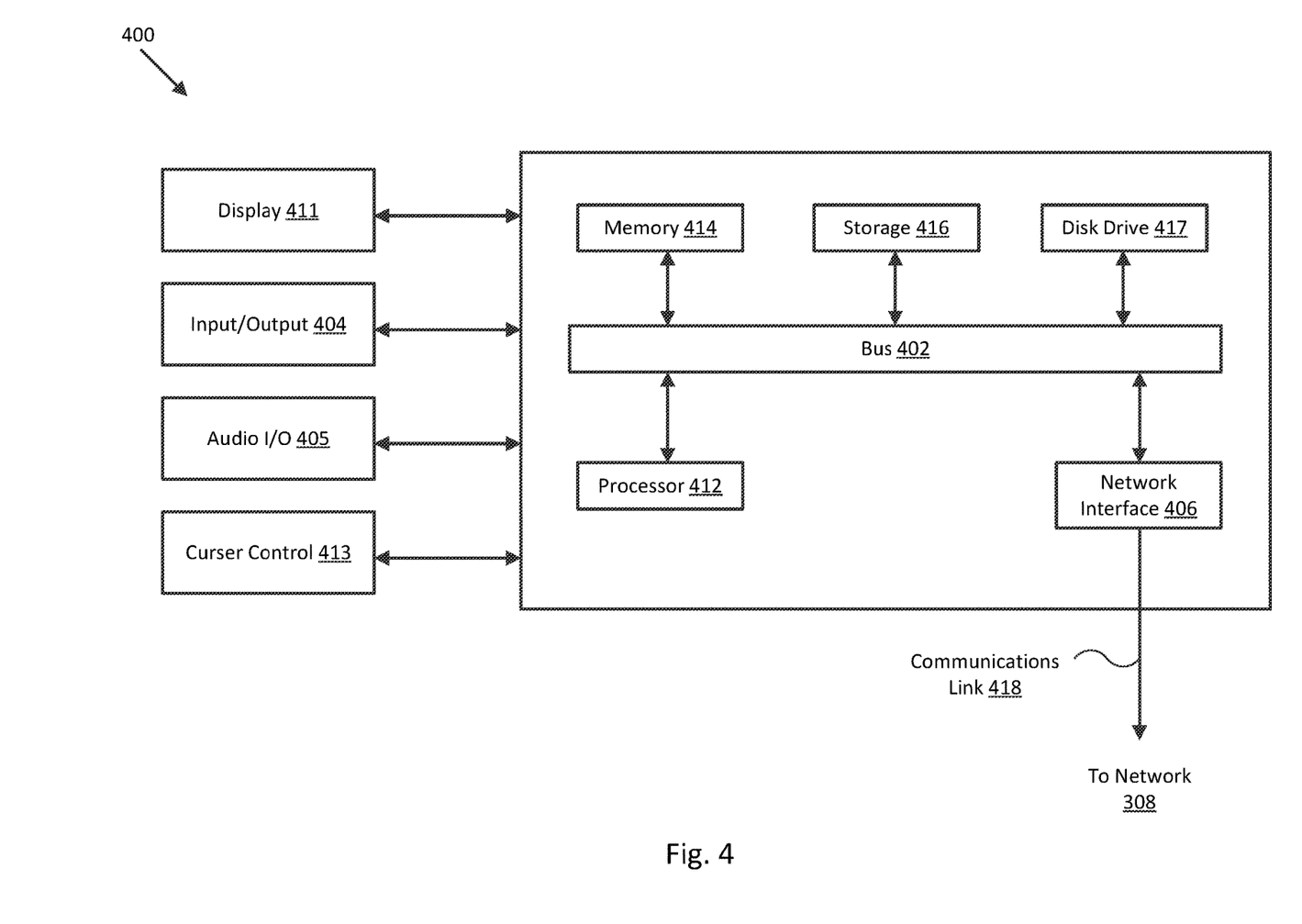
FIG. 4 illustrates a block diagram of a computer system in accordance with one or more embodiments of the present disclosure.

FIG. 4 illustrates a block diagram of a computer system 400 suitable for implementing one or more embodiments of the present disclosure, including user device 100 and/or a service provider device. In various implementations, the computer system 400 may comprise a personal computing device (e.g., a personal computer, laptop, smart phone, PDA, Bluetooth device, key FOB, badge, wearable device such as a smart watch, smart TV, etc.) and/or a server computing device. It should be appreciated that each of the devices utilized by users and service providers discussed herein may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). I/O component 404 may further include NFC communication capabilities. An optional audio I/O component 405 may also be included to allow a user to use voice for inputting information by converting audio signals. Audio I/O component 405 may allow the user to hear audio such as audible descriptions provided by a screen reader application. A transceiver or network interface 406 transmits and receives signals between computer system 400 and other devices, such as another user device, an entity server, and/or a provider server via network 308. In one embodiment, the transmission is wireless, although other transmission mediums and methods may also be suitable. Processor 412, which may be one or more hardware processors, can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer-readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A system comprising:
a non-transitory memory; and
one or more hardware processors coupled to the non-transitory memory and configured to read instructions from the non-transitory memory to cause the system to perform operations comprising:
receiving an input from a user device associated with a user that is participating in a chat bot session with the system, the input received in a conversational graphical user interface (GUI);
generating a graph of a plurality of objects available to the system for an initial dialogue flow associated with the input for the conversational GUI, wherein the graph comprises a layout of the plurality of objects for the initial dialogue flow;
mapping the input to a first intent of the user based on the initial dialogue flow of identifiers connecting the plurality of objects available in the graph from the layout and metadata for the plurality of objects;
determining the first intent of the user based on the graph and the mapping;
based on the first intent of the user, identifying, from the plurality of objects available to the system, one or more objects, wherein each of the plurality of objects has annotations corresponding to one or more elements of the object and one or more functions of the object, and wherein the one or more functions correspond to the one or more elements and are executable during the chat bot session to perform an action upon corresponding elements; and
based on the identified one or more objects and the annotations of the identified one or more objects, generating a dynamic dialogue flow for the conversational GUI, wherein the dynamic dialogue flow is generated in real-time during the chat bot session.

2. The system of claim 1, wherein the generating the dynamic dialogue flow comprises:
subsequent to the identifying the one or more objects, determining a second intent of the user based on an additional received input;
based on the second intent of the user, identifying an element of an object of the identified one or more objects and a function corresponding to the element;
accessing account data corresponding to the element of the object, wherein the account data is stored in a memory at the user device upon establishing the chat bot session;
generating a chat response based on an annotation corresponding to the element and the function, the chat response including the account data corresponding to the element; and
providing the chat response in the conversational GUI.

3. The system of claim 1, wherein the generating the dynamic dialogue flow comprises:
based on the annotations of the identified one or more objects, determining that one or more parameters are required to execute a function of the identified one or more objects on a corresponding element of the identified one or more objects;
generating a prompt in the conversational GUI that requests a user input to be used as the one or more parameters of the function;
receiving the user input responsive to the prompt in the conversational GUI, wherein the user input is acceptable as the one or more parameters of the function; and
executing the function by inputting the user input as the one or more parameters, wherein the execution of the function causes an action to be performed on the element corresponding to the function.

4. The system of claim 1, wherein the operations further comprise:
parsing one or more domains associated with the conversational GUI, wherein each domain includes one or more objects having one or more elements and one or more functions corresponding to each element, and wherein each domain has annotations defining the one or more objects of the domain and the one or more elements and one or more functions of each object;
determining that a domain has been updated based on an annotation made to an object of the domain, the annotation defining an element of the object and a corresponding function of the object; and
based on the annotation of the object of the updated domain, generating a map between a user intent and the element and the corresponding function of the object of the updated domain, wherein the map allows the system to execute the corresponding function in the dynamic dialogue flow upon confirming the user intent through the conversational GUI.

5. The system of claim 1, wherein:
the annotations of the identified one or more objects include a tag identifier that is mapped to the first intent of the user; and
the identifying the one or more objects is performed by matching the first intent of the user to the tag identifier of the annotations.

6. The system of claim 1, wherein the plurality of objects each correspond to one of a plurality of domains.

7. The system of claim 6, wherein the plurality of domains comprises: a user account domain, a financial instrument domain, and a dispute resolution domain.

8. The system of claim 1, wherein the generating the dynamic dialogue flow comprises:
determining a static response to provide in the conversational GUI based at least in part on the annotations of the identified one or more objects, the static response having a dynamic placeholder configured to be replaced by an element; and
generating a chat response comprising the static response and an element of the identified one or more objects that replaces the dynamic placeholder.

9. A method comprising:
receiving, via a conversational graphical user interface (GUI), one or more inputs from a user device of a user participating in a chat bot session with a chat bot system;
generating a graph of a plurality of objects available to the chat bot system for an initial dialogue flow associated with the one or more inputs for the conversational GUI, wherein the graph comprises a layout of the plurality of objects for the initial dialogue flow;
mapping the input to a user intent of the user based on the initial dialogue flow of identifiers connecting the plurality of objects available in the graph from the layout and metadata for the plurality of objects;
determining the user intent based on contextual information associated with the one or more inputs, the graph, and the mapping;
matching the user intent to a tag identifier;
identifying objects that have been mapped to the tag identifier, wherein each of the objects has annotations corresponding to one or more elements of the object and one or more functions of the object, the one or more functions corresponding to the one or more elements; and
generating a dynamic dialogue flow for the conversational GUI based on the identified objects and annotations of the identified objects, wherein the dynamic dialogue flow is generated in real-time during the chat bot session.

10. The method of claim 9, wherein the generating the dynamic dialogue flow comprises:
subsequent to the identifying the objects, determining another intent of the user based on an additional received input;
based on the other intent of the user, identifying an element of an object of the identified objects and a function corresponding to the element;
accessing account data corresponding to the element of the object, wherein the account data is stored in a memory at the user device upon establishing the chat bot session;
generating a chat response based on an annotation corresponding to the element and the function; and
providing the chat response in the conversational GUI.

11. The method of claim 9, wherein the generating the dynamic dialogue flow comprises:
based on the annotations of the identified objects, determining that one or more parameters are required to execute a function of the identified one or more objects on a corresponding element of the identified one or more objects;
generating a prompt in the conversational GUI that requests a user input to be used as the one or more parameters of the function;
receiving the user input responsive to the prompt in the conversational GUI, wherein the user input is acceptable as the one or more parameters of the function; and
executing the function by inputting the user input as the one or more parameters, wherein the execution of the function causes an action to be performed on the element corresponding to the function.

12. The method of claim 9, wherein the operations further comprise:
parsing one or more domains associated with the conversational GUI, wherein each domain includes one or more objects having one or more elements and one or more functions corresponding to each element, and wherein each domain has annotations defining the one or more objects of the domain and the one or more elements and one or more functions of each object;
determining that a domain has been updated based on an annotation made to an object of the domain, the annotation defining an element of the object and a corresponding function of the object; and based on the annotation of the object of the updated domain, generating a map between a user intent and the element and the corresponding function of the object of the updated domain, wherein the map allows the system to execute the corresponding function in the dynamic dialogue flow upon confirming the user intent through the conversational GUI.

13. The method of claim 9, wherein:
the annotations of the identified objects include a tag identifier that is mapped to the first intent of the user; and
the identifying the objects is performed by matching the first intent of the user to the tag identifier of the annotations.

14. The method of claim 9, wherein the generating the dynamic dialogue flow comprises:
determining a static response to provide in the conversational GUI based on the annotations of the identified objects, the static response having a dynamic placeholder configured to be replaced by an element; and
generating a chat response comprising the static response and an element of the identified objects that replaces the dynamic placeholder.

15. A non-transitory machine-readable medium having stored thereon machine-readable instructions executable to cause a machine to perform operations comprising:
initializing a chat bot session between a user device of a user and a system, wherein the system comprises the machine;
receiving an input from a user device through a conversational graphical user interface (GUI) associated with the chat bot session;
generating a graph of a plurality of objects available to the system for an initial dialogue flow associated with the input for the conversational GUI, wherein the graph comprises a layout of the plurality of objects for the initial dialogue flow;
mapping the input to an intent of the user based on the initial dialogue flow of identifiers connecting the plurality of objects available in the graph from the layout and metadata for the plurality of objects;
determining the intent of the user based at least in part on the graph and the mapping;
based on the intent of the user, identifying one or more objects of the plurality of objects that are associated with the intent of the user, wherein each of the one or more objects has annotations corresponding to one or more elements of the object and one or more functions of the object, the one or more functions corresponding to the one or more elements; and
generating a dynamic dialogue flow for the conversational GUI based on the identified one or more objects and the annotations of the identified one or more objects, wherein the dynamic dialogue flow is generated in real-time during the chat bot session.

16. The non-transitory machine-readable medium of claim 15, wherein the generating the dynamic dialogue flow comprises:
subsequent to the identifying the one or more objects, determining a second intent of the user based on an additional received input;
based on the second intent of the user, identifying an element of an object of the identified one or more objects and a function corresponding to the element;
accessing account data corresponding to the element of the object, wherein the account data is stored in a memory at the user device upon establishing the chat bot session;
generating a chat response based on an annotation corresponding to the element and the function; and
providing the chat response in the conversational GUI.

17. The non-transitory machine-readable medium of claim 15, wherein the generating the dynamic dialogue flow comprises:
based on the annotations of the identified one or more objects, determining that one or more parameters are required to execute a function of the identified one or more objects on a corresponding element of the identified one or more objects;
generating a prompt in the conversational GUI that requests a user input to be used as the one or more parameters of the function;
receiving the user input responsive to the prompt in the conversational GUI, wherein the user input is acceptable as the one or more parameters of the function; and
executing the function by inputting the user input as the one or more parameters, wherein the execution of the function causes an action to be performed on the element corresponding to the function.

18. The non-transitory machine-readable medium of claim 15, wherein the operations further comprise:
parsing one or more domains associated with the conversational GUI, wherein each domain includes one or more objects having one or more elements and one or more functions corresponding to each element, and wherein each domain has annotations defining the one or more objects of the domain and the one or more elements and one or more functions of each object;
determining that a domain has been updated based on an annotation made to an object of the domain, the annotation defining an element of the object and a corresponding function of the object; and
based on the annotation of the object of the updated domain, generating a map between a user intent and the element and the corresponding function of the object of the updated domain, wherein the map allows the system to execute the corresponding function in the dynamic dialogue flow upon confirming the user intent through the conversational GUI.

19. The non-transitory machine-readable medium of claim 15, wherein:
the annotations of the identified one or more objects include a tag identifier that is mapped to the first intent of the user; and
the identifying the one or more objects is performed by matching the first intent of the user to the tag identifier of the annotations.

20. The non-transitory machine-readable medium of claim 15, wherein the generating the dynamic dialogue flow comprises:
determining a static response to provide in the conversational GUI based on the annotations of the identified objects, the static response having a dynamic placeholder configured to be replaced by an element; and
generating a chat response comprising the static response and an element of the identified objects that replaces the dynamic placeholder.

\* \* \* \* \*